United States Patent Office 3,285,759
Patented Nov. 15, 1966

3,285,759
REFRACTORY METALLURGIC COMPOSITION AND PRODUCTS, AND METHOD OF OBTAINING SAME
Giovanni Crespi, Via Tranquillo Cremona 29, Milan, Italy
No Drawing. Filed Sept. 2, 1965, Ser. No. 484,765
Claims priority, application Italy, Mar. 26, 1962, 21,795, Patent 685,116
12 Claims. (Cl. 106—58)

This application is a continuation-in-part of my copending application, Serial No. 267,963, filed March 26, 1963, now abandoned, for "Refractory Basic Mixture for Metallurgic Use, Method for Obtaining Same, and Products Thereof Obtainable."

The present application relates to refractory metallurgic compositions and products and to the method of preparing same. More particularly, the present invention relates to the preparation of such compositions and products employing dolomite which has been stabilized to prevent the loss of its thermic characteristics under the influence of moisture.

It is known in the field of iron metallurgy to employ refractory basic mixtures formed for instance of magnesite, chromite, and alumina, or mixtures thereof. Such refractory basic mixtures have thermic characteristics, but are very expensive. For this reason, they have not been employed in general use, but only in special situations.

Among the objects of the present invention are to provide economical refractory metallurgic compositions and products which may be employed on a large scale, for example, for the forming of rams (p.s.i.é.), coatings of metallurgic furnaces, and ladles, and for the forming of bricks, blocks, and elements of special shape for masonry, vaults, bottoms of metallurgic furnaces. Other objects, features and advantages of the invention will become apparent as this description proceeds.

Dolomite is a material which satisfies the economical requirements, and which also has high thermic characteristics. However, dolomite has the disadvantage of rapidly losing its thermic characteristics under the influence of moisture. For this reason, it is difficult to store dolomite, especially in powder form. In order to at least partially obviate such disadvantages, it was tried, where possible, to substitute for powdered dolomite, dolomite in pieces, which is less sensitive to atmospheric moisture. In such instances, the intrestices between the dolomite pieces were filled with dolomite powder or granules, and after the elements were manufactured from these mixtures; it was attempted to protect same against atmospheric agents with special lacquers or metal sheeting. Nevertheless, the difficulty of preserving the raw material, both in pieces and powder or granules, for the manufacture of these elements was not overcome.

It is now been ascertained experimentally that mixtures of dolomite with from about 10 to 30% based on the dry weight of dolomite of calcium, magnesium, or aluminum nitrates, or mixtures thereof, are practically insensitive to atmospheric moisture, and show thermic characteristics similar to those of pure dolomite.

A mixture of this type may be obtained by thoroughly mixing dolomite in powder form with from about 14 to 40% based on the weight of dolomite of a saturated solution of one or more of the above mentioned nitrates. To the nitrate solution, which acts as a chemical binder, there may be added up to about 10–20%, based on the weight of the nitrate solution, of a ferric perchloride saturated solution. The ferric perchloride further ammeliorates the resistance of the mixture to atmospheric agents, and although slightly increasing the cost of the mixture, finds particular use in employment for those parts of masonry for rams which are most exposed to the external environment, for instance, those provided at the external part of metallic protection, especially vaults. The mixture of powdered dolomite and dolomite granules, which shows the highest density is obtained by using about 50% very fine granules, and the remainder granules measuring from about 0.2 to 2 millimeters, but good results are also obtained by mixing 25% of very fine dolomite with 75% dolomite having granules measuring up to about 1 millimeter.

Tests upon the dolomite-nitrate mixtures of the present invention have revealed that bricks and blocks manufactured therefrom are preserved intact when exposed to air and moisture for several months, i.e., without cracks appearing and water being absorbed.

The stabilizing action of the nitrates last as long as the mixtures are not exposed to fire since the nitrates volatilize under such conditions. Therefore, when the refractory products are destined for use in which phases of exposure to fire alternate with phases of inactivity, there should also be added to the dolomite, minerals such as bauxite, sillimanite, kyanite, chromite, alumina, magnesite, and phosphorite, or mixtures thereof, which at high temperatures operate in a normal way as stabilizing components. The amount of these stabilizing components may vary from about 8 to 30% based on the weight of the dolomite. In such instances, the stabilizing action supplied by the nitrates prior to exposure to fire, is continued after the first exposure to fire, by one of the stabilizing components of the above type which have neutral or basic natures.

When such high temperature stabilizing components are to be employed, it is desirable that the nitrate solution be entirely, or at least in part, a solution of aluminum nitrate. Particularly good results have been obtained when the amount of aluminum nitrate is from about 30 to 50% based on the weight of the calcium nitrate and/or magnesium nitrate.

The following examples are submitted by way of illustration, and the invention should not be considered as specifically limited thereto.

*Example I*

Materials employed: Kgs.
 Fine calcinated dolomite, maximum size 2 mm. 100
 Aluminum nitrate saturated solution _____ 8
 Magnesium nitrate saturated solution _____ 6

The two solutions were mixed together at room temperature by stirring. The sole solution thus obtained was carefully mixed with the dolomite. A damp (moist) powder products was obtained which was tamped in layers to form pre-fabricated refractory blocks for siderurgical furnaces and bottoms for said furnaces made in loco.

*Example II*

Materials employed: Kgs.
 Fine calcinated dolomite, maximum size 1 mm. 100
 Bauxite, maximum size 1 mm. _____ 10
 Aluminum nitrate saturated solution _____ 10
 Magnesium nitrate saturated solution _____ 4

The two solutions were mixed together at room temperature by intense stirring. The sole solution thus obtained was then added to a mixture previously made from the dolomite and bauxite, and stirred until admixture was completed. The product had excellent characteristics to be tamped for forming prefabricated refractory bricks and blocks, and also furnace bottoms made in loco.

Example III

Materials employed: Kgs.
- Fine calcinated dolomite, maximum size 1.5 mm. 100
- Alumina _____ 8
- Aluminum nitrate saturated solution _____ 10
- Calcium nitrate saturated solution _____ 6

As in the preceding example, the two solutions were mixed together, and the dolomite and alumina were mixed together. The liquid solution and the solid mixture were then carefully mixed in order to form a damp (moist) powder products very efficacious for the formation of refractory blocks and bricks or the like, sidertugical furnaces, and also for the formation of bottoms or other parts of said furnaces made in loco.

While the above examples employ calcined dolomite, the compositions of the present invention can be prepared from raw (uncalcined) dolomite, and calcined after adding the stabilizing substances. Similarly, the invention is not limited to the illustrated manner of incorporating the nitrates into dolomite mixtures, but encompasses mixtures of dolomite and said nitrates, however prepared.

While the above specification has referred to dolomite in particular, it is evident that another mineral of calcium and/or magnesium having similar properties such as limestone or limestone with small percentages of magnesium could be substituted therefor in whole or in part. While the above examples employ dolomite in powdered form, it will be appreciated that the invention encompasses also the use of dolomite in large pieces or stabilized dolomite in granular form. The part of the dolomite in the mixture constituted by dolomite pieces of variable dimensions, for example, from 40 to 120 mm., or constituted by granules of 5 to 15 mm., may represent from about 30 up to about 50% of the amount of dolomite in powder form.

Bricks, blocks, or other elements of the type mentioned hereinabove may be obtained from the refractory metallurgic compositions of the present invention by conventional procedures, for example, bricks may be formed by tamping if necessary in several layers in suitable molds. The bricks so formed may be employed as they are, or they may undergo a drying or baking process before use, and in both cases may be lacquered or lined with a metal sheeting and supplied with metal frames.

While preferred embodiments of the invention have been shown and described, it will be appreciated that the various modifications thereof may suggest themselves to one skilled in the art without departing from the scope and spirit of the present invention. It is intended to encompass all such changes and modifications as fall within the scope of the appended claims.

What is claimed is:

1. A refractory metallurgical composition essentially consisting of dolomite, and from about 10% to 30% based on the dry weight of the dolomite of at least one nitrate selected from the group consisting of calcium, magnesium, and aluminum nitrates.

2. A refractory metallurgic composition according to claim 1, wherein the dolomite is in powder form.

3. A refractory metallurgic composition according to claim 1, wherein the dolomite is a mixture of powder and about 30% to 50% based on the amount of powder of pieces of from 40 to 120 millimeters in size.

4. A refractory metallurgic composition according to claim 1, wherein the dolomite is a mixture of powder and about 30% to 50% based on the amount of powder of granules from about 5 to 15 millimeters in size.

5. A refractory metallurgic composition according to claim 1, wherein the nitrates are a mixture of calcium nitrate and magnesium nitrate.

6. A refractory metallurgic composition according to claim 1, further comprising as a stabilizer for the thermic characteristics of the dolomite a stabilizing amount of a compound selected from the group consisting of bauxite, sillimanite, kyanite, chromite, alumina, phosphorite, and mixtures thereof.

7. A refractory metallurgic composition according to claim 1, wherein the nitrate is added in the form of a nitrate solution, and further comprising about 10–20%, based on the weight of the nitrate solution, of a saturated solution of ferric perchloride.

8. A process for preparing a refractory basic mixture for metallurgic use, comprising the steps of mixing dolomite at least partially in powder form with from about 14 to 40% based on the dry weight of the dolomite of a substantially saturated solution of at least one nitrate wherein the nitrate is selected from the group consisting of calcium, magnesium, and aluminum nitrates.

9. A process according to claim 8, further comprising adding a stabilizer selected from the group consisting of bauxite, sillimanite, kyanite, chromite, alumina, and phosphorite.

10. A process according to claim 8, in which the dolomite is raw (uncalcined) dolomite and the solution of nitrate is added partially before calcining and partially after calcining the mixture, the calcining operation being effected at high temperatures.

11. A refractory brick essentially consisting of calcined dolomite and from about 10% to 30% based on the dry weight of the dolomite of at least one nitrate selected from the group consisting of calcium, magnesium, and aluminum nitrates.

12. A refractory metallurgic composition consisting essentially of dolomite, from about 10 to 30% based on the dry weight of dolomite of at least one nitrate selected from the group consisting of calcium, magnesium, and aluminum nitrates, and from about 8 to 30% based on the dry weight of dolomite of at least one compound selected from the group consisting of bauxite, sillimanite, kyanite, chromite, alumina, and phosphorite.

References Cited by the Examiner
UNITED STATES PATENTS

| | | | |
|---|---|---|---|
| 783,750 | 2/1905 | Ellis et al. | 106—105 |
| 2,245,297 | 6/1941 | Pitt et al. | 106—61 |
| 2,616,150 | 11/1952 | Vettel | 106—61 |

TOBIAS E. LEVOW, *Primary Examiner.*

J. E. POER, *Assistant Examiner.*